(12) United States Patent  
Mercier et al.

(10) Patent No.: US 8,344,884 B2  
(45) Date of Patent: Jan. 1, 2013

(54) SYSTEM, METHOD, AND APPARATUS FOR TRIGGERING AN ALARM

(75) Inventors: Michael Mercier, Charlotte, NC (US); Gary Mark Shafer, Charlotte, NC (US); Lee H. Eckert, Waxhaw, NC (US)

(73) Assignee: Checkpoint Systems, Inc., Thorofare, NJ (US)

( * ) Notice: Subject to any disclaimer, the term of this patent is extended or adjusted under 35 U.S.C. 154(b) by 0 days.

(21) Appl. No.: 13/175,492

(22) Filed: Jul. 1, 2011

(65) Prior Publication Data

US 2012/0001756 A1 Jan. 5, 2012

Related U.S. Application Data

(63) Continuation of application No. 12/892,498, filed on Sep. 28, 2010, now Pat. No. 7,994,911.

(60) Provisional application No. 61/246,393, filed on Sep. 28, 2009.

(51) Int. Cl.  
*G08B 13/00* (2006.01)

(52) U.S. Cl. .................. 340/541; 340/568.1; 340/568.2; 340/571; 340/572.1; 235/375; 235/435

(58) Field of Classification Search .................. 340/541, 340/568.1, 568.2, 571, 572.1, 10.1; 235/375, 235/435, 444, 449, 493

See application file for complete search history.

(56) References Cited

U.S. PATENT DOCUMENTS

| | | | |
|---|---|---|---|
| 7,148,804 B2* | 12/2006 | Salesky et al. | 340/572.4 |
| 7,443,298 B2 | 10/2008 | Cole et al. | |
| 7,782,207 B2* | 8/2010 | Gillard et al. | 340/572.1 |
| 7,800,490 B2* | 9/2010 | Allen et al. | 340/522 |
| 7,994,911 B2* | 8/2011 | Mercier et al. | 340/541 |

FOREIGN PATENT DOCUMENTS

| | | |
|---|---|---|
| EP | 0 449 173 A2 | 10/1991 |
| GB | 2 205 426 A | 12/1988 |
| WO | WO 2007/070103 A1 | 6/2007 |
| WO | WO 2008/132269 A1 | 11/2008 |

OTHER PUBLICATIONS

International Search Report and Written Opinion for International Application No. PCT/US2010/050561, mailed Dec. 6, 2010; 11 pages.

* cited by examiner

*Primary Examiner* — Toan N Pham

(74) *Attorney, Agent, or Firm* — Alston & Bird LLP

(57) ABSTRACT

According to some example embodiments, systems, apparatus, methods and computer program products are provided for triggering an alarm. In this regard, one example apparatus includes means for receiving an instruction to alarm a security gate device, and means for tuning a security resonator at a location such that a field generated by the security gate device interacts with the security resonator to cause the security gate device to trigger an alarm in response to at least receiving the instruction to alarm the security gate device.

19 Claims, 6 Drawing Sheets

SYSTEM, METHOD, AND APPARATUS FOR TRIGGERING AN ALARM

CROSS-REFERENCE TO RELATED APPLICATIONS

This patent application is a continuation of U.S. patent application Ser. No. 12/892,498, filed on Sep. 28, 2010 entitled "System, Method, and Apparatus for Triggering an Alarm," which issued as U.S. Pat. No. 7,994,911 on Aug. 9, 2011, which claims priority to U.S. Provisional Patent Application No. 61/246,393, filed Sep. 28, 2009, titled "Systems, Methods, And Apparatuses For Managing Configurable Monitoring Devices." The contents of Application No. 61/246,393, and U.S. Pat. No. 7,994,911 are hereby incorporated by reference in their entireties.

TECHNOLOGICAL FIELD

Various embodiments of the present invention relate generally to theft deterrent technology and, more particularly, relate to triggering one or more alarms.

BACKGROUND

Retailers and business owners can suffer substantial financial losses as a result of retail theft. It is becoming increasingly common for shoplifters and thieves to implement organized and coordinated plans involving multiple individuals to steal large amounts of high priced goods from retail and other establishments. To protect against such losses, store owners have installed various systems that operate to deter theft through the use of alarms and other deterrent mechanisms. However, as thieves become more sophisticated, theft deterrent systems may be circumvented by new techniques and equipment used by would-be thieves. As such, the technology used for theft deterrence must continue to evolve to meet and exceed the continually evolving sophistication of theft techniques, and in particular, organized theft techniques.

BRIEF SUMMARY

Some example embodiments of the present invention are therefore provided that support product security system functionality. In this regard, one example embodiment is a method. The example method may include receiving an instruction to alarm a security gate device, and, in response to at least receiving the instruction to alarm the security gate device, tuning a security resonator at a location such that a field generated by the security gate device interacts with the security resonator to cause the security gate device to trigger an alarm.

Another example embodiment is an apparatus. The example apparatus may include a processor. The processor may be configured to receive an instruction to alarm a security gate device, and, in response to at least receiving the instruction to alarm the security gate device, tune a security resonator at a location such that a field generated by the security gate device interacts with the security resonator to cause the security gate device to trigger an alarm.

Yet another example embodiment is a computer readable medium, such as a non-transitory computer readable memory. The computer readable medium may include, or for example store, executable instructions configured to direct a processor to perform particular functionality. In this regard, the executable instructions may be configured to direct the processor to receive an instruction to alarm a security gate device, and, in response to at least receiving the instruction to alarm the security gate device, tune a security resonator at a location such that a field generated by the security gate device interacts with the security resonator to cause the security gate device to trigger an alarm.

Another example embodiment is an apparatus. The example apparatus may include means for receiving an instruction to alarm a security gate device, and means for tuning a security resonator at a location such that a field generated by the security gate device interacts with the security resonator to cause the security gate device to trigger an alarm in response to at least receiving the instruction to alarm the security gate device.

Additionally, another example embodiments of the present invention may be yet another example method. The example method may include receiving a ping signal and determining that the ping signal originated from a gate node. In this regard, the gate node may control a tunable security resonator that may be positioned within a field generated by a security gate device. The example method may further include directing a transmitter to transmit a status signal to a network indicating that a monitoring device is within a field generated by the gate node.

An example apparatus may include a processor. The processor may be configured to perform receiving a ping signal and determining that the ping signal originated from a gate node. In this regard, the gate node may control a tunable security resonator that may be positioned within a field generated by a security gate device. The processor may be further configured to perform directing a transmitter to transmit a status signal to a network indicating that a monitoring device is within a field generated by the gate node.

Yet another example embodiment is a computer readable medium, such as a non-transitory computer readable memory. The computer readable medium may include, or for example store, executable instructions configured to direct a processor to perform particular functionality. In this regard, the executable instructions may be configured to direct the processor to perform receiving a ping signal and determining that the ping signal originated from a gate node. In this regard, the gate node may control a tunable security resonator that may be positioned within a field generated by a security gate device. The instructions may be further configured to direct the processor to perform directing a transmitter to transmit a status signal to a network indicating that a monitoring device is within a field generated by the gate node.

Another example embodiment may be an apparatus. The example apparatus may include means for receiving a ping signal and means for determining that the ping signal originated from a gate node. In this regard, the gate node may control a tunable security resonator that may be positioned within a field generated by a security gate device. The example apparatus may further include means for directing a transmitter to transmit a status signal to a network indicating that a monitoring device is within a field generated by the gate node.

BRIEF DESCRIPTION OF THE SEVERAL VIEWS OF THE DRAWING(S)

Having thus described the various example embodiments of the invention in general terms, reference will now be made to the accompanying drawings, which are not necessarily drawn to scale, and wherein:

FIG. 1 is an example layout of an exit or other security protected area and various devices for implementing some example embodiments of the present invention;

FIG. 2 a signaling diagram/flow chart of some example method embodiments of the present invention;

DETAILED DESCRIPTION

Figure 1:
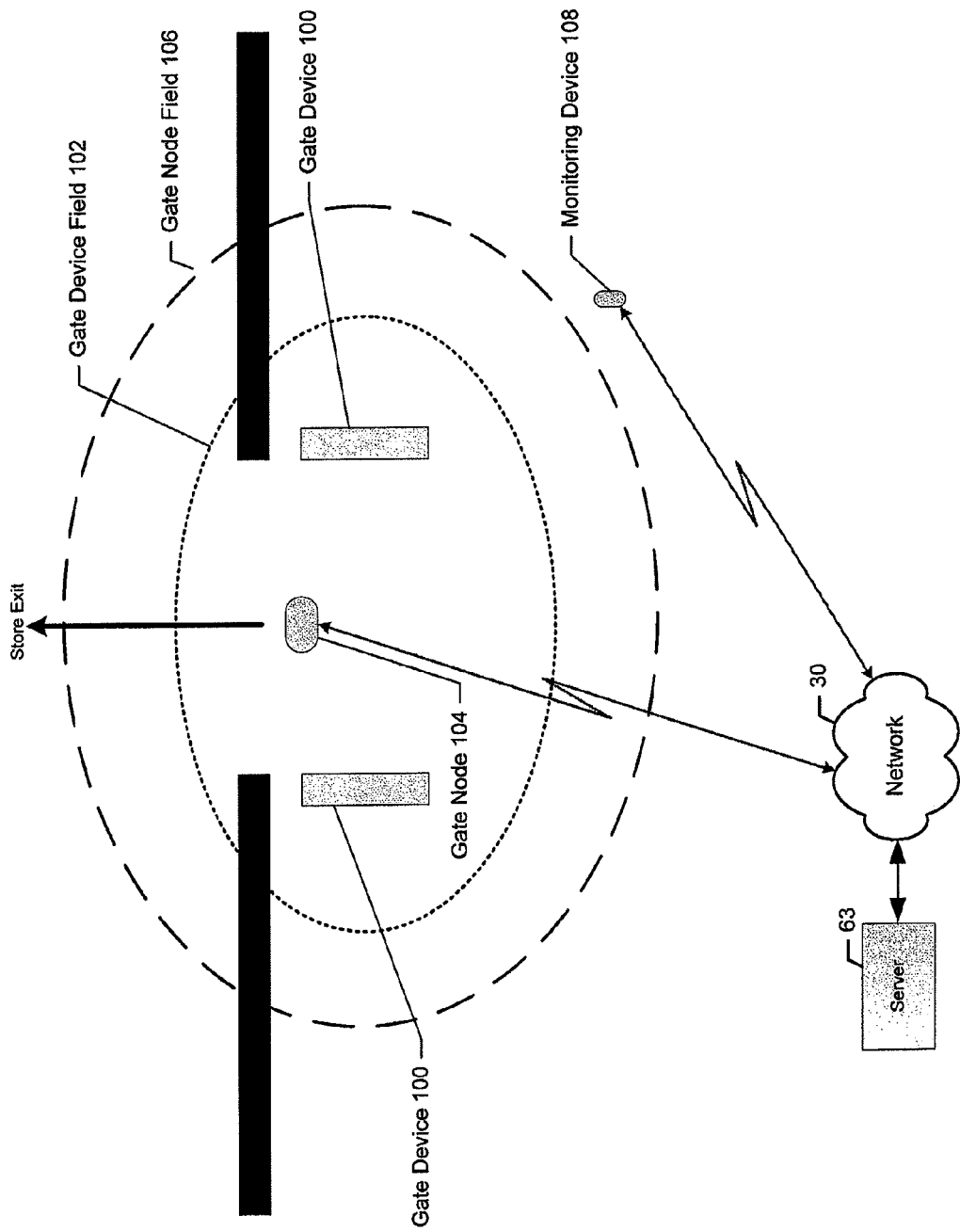

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As defined herein a "computer-readable medium" may encompass both transitory and non-transitory media. However, a "computer-readable storage medium" refers to a non-transitory medium, such as for example, a memory device, while a "computer-readable transmission medium" refers to transitory medium, such as, for example, propagating electromagnetic signals. Additionally, as used herein, the term "circuitry" refers to not only hardware-only circuit implementations including analog and/or digital circuitry, but at least also to combinations of hardware with corresponding software and/or instructions stored on a computer-readable storage medium.

Various example embodiments of the present invention may operate, and/or may be configured, to trigger an alarming function of a gate device (also referred to as a security gate device). A gate device may be an electronic article surveillance (EAS) gate that may be used near the entrance or exit of retail environment. Referring to FIG. 1, gate device 100 (which is comprised of two posts or gates) is illustrated as being positioned on either side of an exit. The gate device 100 may be configured to alarm when an security resonator (e.g., a radio frequency resonant circuit or device, an acousto-magnetic resonant circuit or device, a magnetic resonant circuit, or the like) is detected within a gate device field 102 (e.g., an electromagnetic field) generated by the gate device 100. In this regard, the gate device field 102 may be configured to excite and energize a security resonator circuit and cause the security resonator to transmit a response (for example, via passive backscatter techniques) that is detected by the gate device 100. The gate device 100 may be therefore configured to detect to presence of the security resonator within the gate device field 102 and respond by, for example, sounding an alarm controlled by the gate device 100. Additionally, in some example embodiments, tuning the security resonator may include modifying a characteristic of an element (e.g., a capacitor, resistor, inductor, or the like) to thereby to the security resonator to a desired frequency that triggers the alarm of the gate device. In other words, a circuit that is out-of-tune with gate device may be brought into tune with the gate device or vice versa.

According to various example embodiments, a gate node 104 may be a device that includes a tunable security resonator and may be positioned at a fixed location within the gate device field 102. The gate node 104 may be configured to tune the security resonator to a frequency that the gate device 100 is configured to detect to permit triggering of the alarm controlled by the gate device 100. According to some example embodiments, tuning a security resonator may include closing or opening a switching device electrically connected between a coil and a capacitor. See FIG. 6 which is described in further detail below. Via control of the switching device, the security resonator may be tuned by the gate node 104 such that the presence of the security resonator within the gate device field 102 causes, or does not cause, the gate device 100 to trigger the alarm. In this manner, the gate node 104 may be configured to control the alarming functionality of the gate device 100, by tuning or de-tuning the security resonator.

Figure 3:
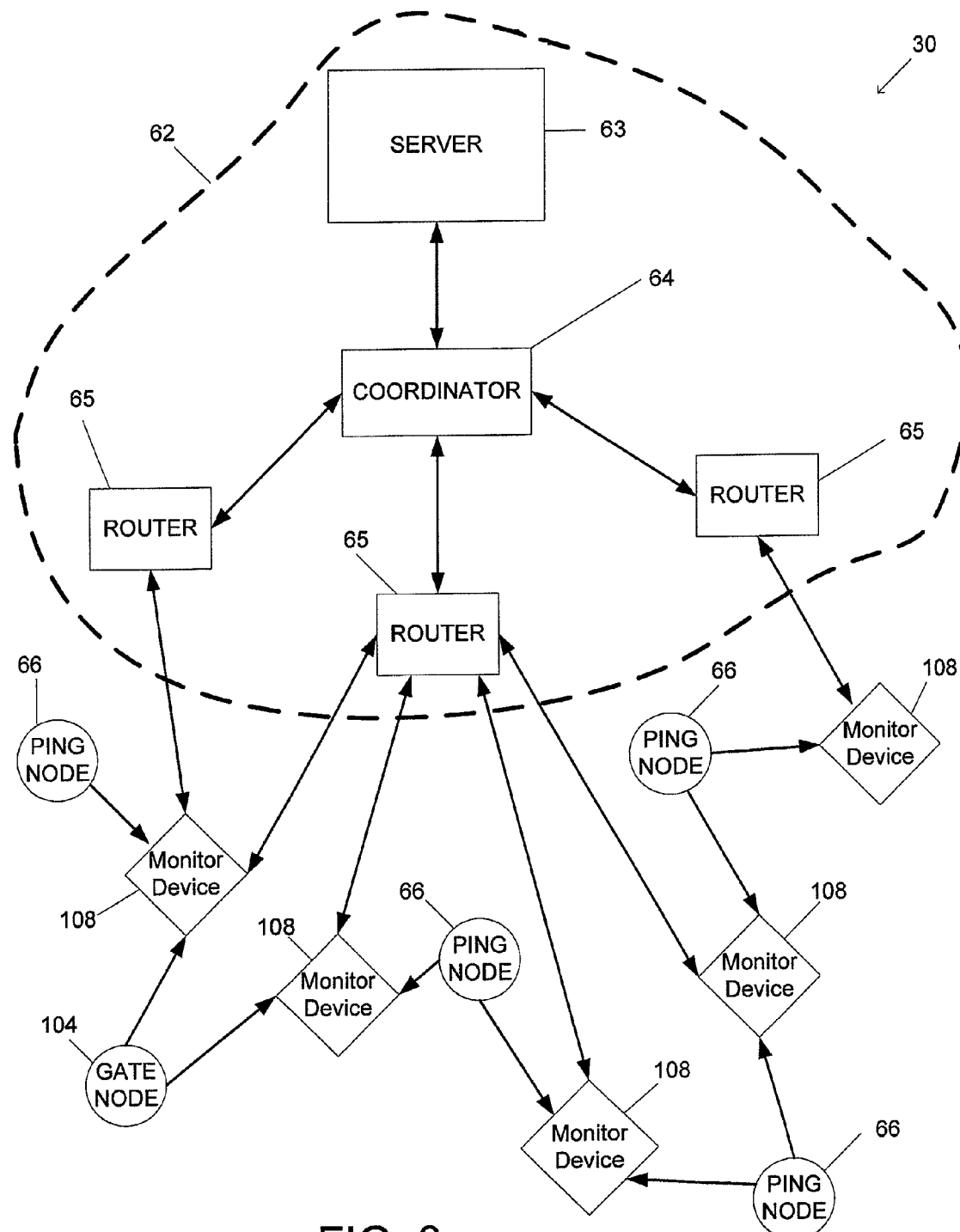
FIG. 3 is a schematic block diagram of a network according to an example embodiment of the present invention.
Figure 4:
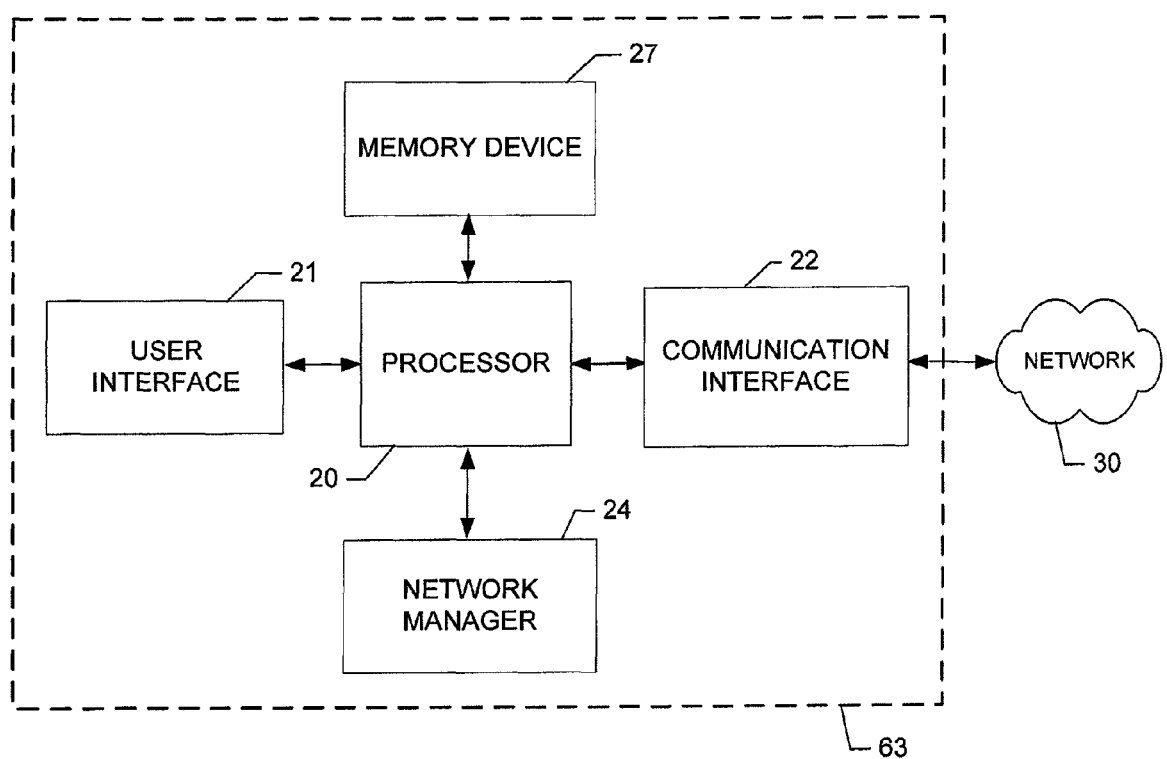
FIG. 4 illustrates an example server that is specifically configured for performing functionality according to an example embodiment.

According to various example embodiments, the gate node 104 may also generate a field, which is referred to as the gate node field 106. The bounds of the gate node field 106 may be defined by a communication range of a ping signal (or beacon signal) transmitted by the gate node 104. In this regard, the gate node 104 may be configured to transmit a ping signal to a defined area, by for example tailoring the signal strength of the ping signal to cover a particular area of the retail environment (e.g., the area near an exit or other area of the retail environment). The ping signal may include a unique identifier of the gate node 104, and the ping signal may be transmitted repeatedly, possibly at a regular interval such as every 2 seconds. The ping signal of the gate node 104 may be configured for reception by a monitoring device 108. According to various example embodiments, the monitoring device 108 may be configured to wirelessly receive the ping signal directly from the gate node 104, without, for example, involving the communications infrastructure of the network 30 (e.g., routers 65 and the coordinator 64 as depicted in FIG. 3). An example of a monitoring device is described in U.S. Non-Provisional patent application Ser. No. 12/628,863, filed Dec. 1, 2009, entitled "Configurable Monitoring Device;" and U.S. Non-Provisional patent application Ser. No. 12/887,228, filed Sep. 21, 2010, entitled "Retail Product Tracking System, Method, and Apparatus;" the contents of which are both hereby incorporated by reference in their entirety.

The monitoring device 108 may be a mobile unit configured to support security, as well as, marketing, inventory, and other functionalities in a retail environment via the monitoring device's capability to conduct wireless communications via a network 30. The monitoring device 108 may be affixed to an article, such as a high priced product that is for sale within the retail environment. According to some example embodiments, the monitoring device 108 may not include a security resonator, and as such, may not be unilaterally capable of triggering the alarm controlled by the gate device 100 when the monitoring device 108 moves into the gate device field 102. However, the monitoring device 108 may be configured to receive the ping signal from the gate node 104 when the monitoring device 108 moves within the gate node field 106.

Figure 2:
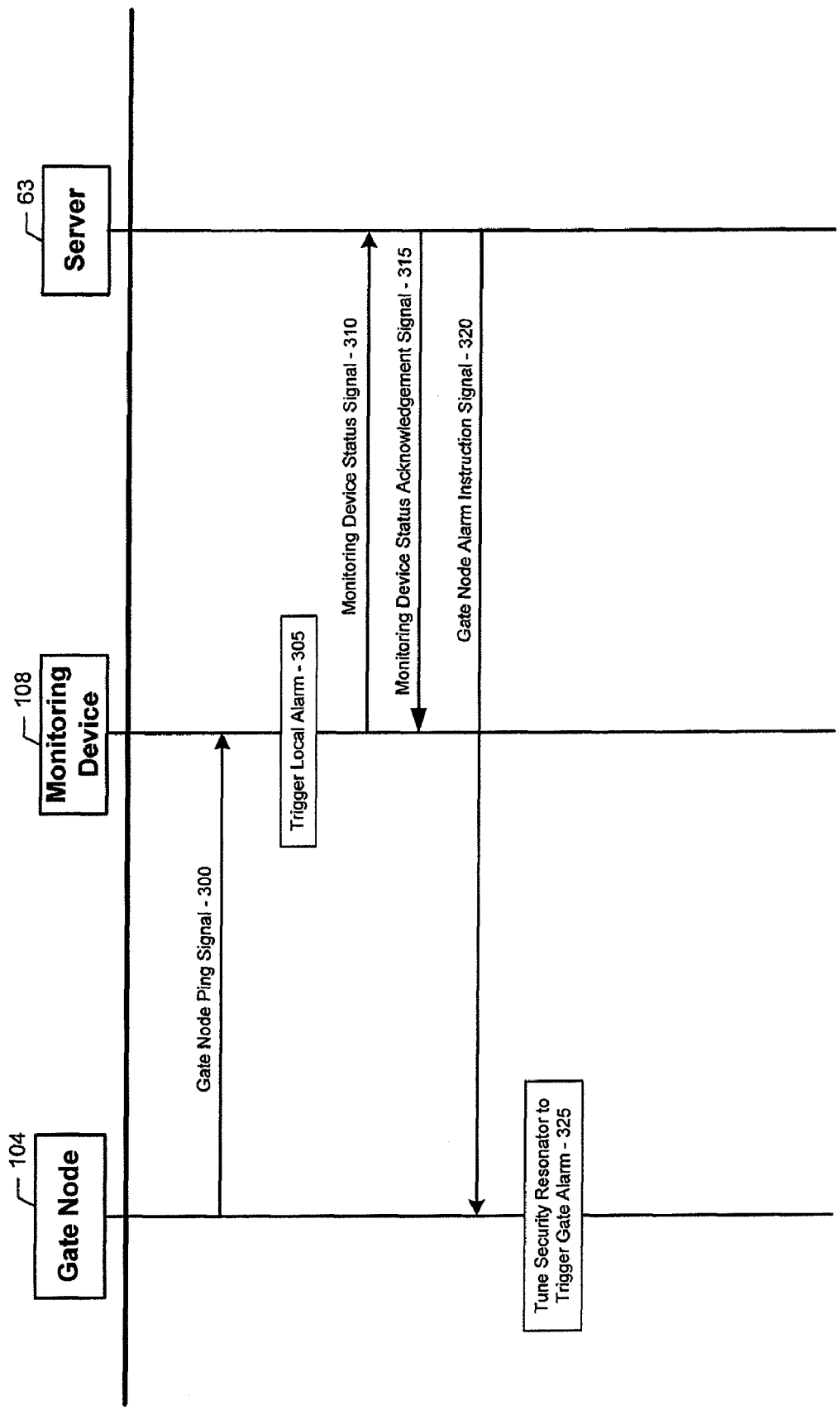

Referring to the signaling diagram of FIG. 2, the monitoring device 108 may be configured to receive the ping signal transmitted by the gate node 104 at 300, when the monitoring device 108 moves within the gate node field 106. After receiving the ping signal from the gate node 104, the monitoring device 108 may be configured to wirelessly transmit a status signal at 310 to a server 63 via a network 30 (described in more detail with reference to FIG. 3). According to some example embodiments, when awake and commissioned, the monitoring device 108 may be configured to transmit status signals, possibly at regular intervals, with an indication of the one or more devices that the monitoring device 108 is currently receiving ping signals from. According to various example embodiments, both the monitoring terminal 108 and the gate node 104 may be connected to the network 30, but the gate device 100 may not be connected to the network 30. The status signal transmitted by the monitoring device 108 at 310 may indicate to the server 63 that the monitoring device 108 is receiving a ping signal from within the gate node field 106. According to some example embodiments, the server 63 may provide an acknowledgement of receipt of the status signal at 315 to the monitoring device 108. In response to determining that the monitoring device 108 is within the gate node field 106, the server 63 may be configured to transmit, via the network 30, a gate node alarm instruction signal to the gate node 104 at 320. In response to receiving the gate node alarm instruction signal, the gate node 104 may be configured to tune the security resonator to cause the gate device 100 to trigger an alarm controlled by the gate device 100. As a result, according to various example embodiments, the presence of the monitoring device 108 within the gate node field 106 may cause the alarm controlled by the gate device 100 to be triggered, when the gate device 100 is not configured to communicate via the network 30 and the and the monitoring device 108 does not include a security resonator. According to some example embodiments, the monitoring device 108 may be configured to send a message to the gate node directly to cause tuning of the security resonator. This message may be received as an alarm instruction, but may be, for example, a status signal that is transmitted by the monitoring device and received by the gate node 104.

Additionally, upon receiving the ping signal at 300, the monitoring device 108 may be configured to analyze the unique identifier included in the ping signal. In this regard, prior to and/or independent of receiving any type of communication from the network 30, the monitoring device 108 may be configured to determine that the ping signal originated from a gate node. For example, in some example embodiments, the ping signal may include a device descriptor which may indicate that the ping signal originated from a gate node. In response to determining that the ping signal originated from a gate node, the monitoring device 108 may be configured to trigger an alarm that is local to the monitoring device 108 (e.g., alarm 42 of FIG. 5) at 305 of FIG. 2. In this regard, prior to and/or independent of receiving any type of communication from the network 30, the monitoring device 108 may be configured to determine that the received ping signal originated from a gate node and trigger the local alarm. According to various example embodiments, by providing for this independent local alarm triggering functionality, even in scenarios when the network 30 and the server 63 are not in service (e.g., due to loss of power to the retail store), an alarm will still sound when a monitoring device 108 enters gate node field 106 because both the monitoring device 108 and the hardware of the gate node 104 configured to provide the ping signal may be battery powered.

Further, according to some example embodiments, the gate node 104 may also be leveraged for gate device testing and calibration purposes. In this regard, since the server 63 can remotely control the tuning of the security resonator, a gate node 104 may be placed at various or multiple locations proximate to the gate device 100 for testing and calibrating the field generation and range of the gate device 100. For example, a gate node may be placed at a location that is expected to be outside the threshold range of the gate device 100. The gate node 104 may then be requested to tune the security resonator to trigger the gate device's alarm to determine the actual range of the field of the gate device. Based on the results, the field of the gate device 100 may be calibrated accordingly.

According to some example embodiments, the functionality associated with the gate node may be separated between to two or more devices. In this regard, one device may be configured to send a ping signal with an identifier and/or device type that indicates that this device is associated with a gate node. A second device may be configured to receive the gate node alarm instruction signal from the server 63 and respond by tuning the security resonator located in the field of the gate device 100. In this manner, since the device that transmits the ping signal and the device that controls the security resonator are separated, the device that transmits the ping signal may be located at any location and still be involved in causing the gate device 100 to trigger the alarm. For example, the device that transmits the ping signal may be located outside the gate device field 102, while the controllable security resonator may be located within the gate device field 102.

FIGS. 3-7 provide detailed descriptions of some example architectures of systems and devices that are configured to perform the functionality described with respect to FIGS. 1 and 2, and otherwise herein. One of skill in the art would appreciate that the descriptions of FIGS. 3-7 are directed to example architectures and configurations and that equivalent alternative structures configured to perform the same functionality are also contemplated.

FIG. 3 illustrates an example embodiment of a network 30, which may comprise a network entity 62, at least one ping node 66, at least one gate node 104, and at least one monitoring device 108. The network entity 62 may comprise the server 63, a coordinator 64, and at least one router 65. The server 63 may be configured to manage, control, and/or log the operation of the entities connected to the network 30. The server's connection to the network 30 may be provided via the coordinator 64. The coordinator 64 may be configured to route communications to and from the server 63 and amongst the routers 65, as needed. In the depicted example embodiment, multiple routers 65 communicate with the coordinator 64. The routers 65 may be configured to receive signals from the monitoring devices 108 and communicate that signal, or a modified version of that signal, to the coordinator 64 and the server 63. The routers 65 and coordinator 64 may include radio transmitters/receivers for sending and receiving wireless signals and may embody the communications infrastructure of the network 30. The communications connections amongst the routers 65 and between the coordinator 64 may be wired or wireless connections. Additionally, in some example embodiments, the coordinator 64 may be connected to the server 63 via a wired connection, which may support higher speeds and bandwidth relative to other wireless communications connections within the network 30.

The ping nodes 66 (also referred to as locators) may be placed throughout an environment, such as a commercial or retail environment, at designated positions to track the presence of monitoring devices 108 within areas associated with the positions of the ping nodes 66. The ping nodes 66 may be configured to transmit ping signals. As such, based on the foregoing description of the gate node 104, the gate node 104 may include ping node functionality. As mobile devices, the monitoring devices 108 may move throughout the environment and receive the ping signals transmitted from the ping nodes 66 and gate nodes 104. When active and commissioned, the monitoring devices 108 may be configured to wirelessly transmit status signals indicating the ping nodes and gate nodes from which the monitoring devices 108 are currently receiving ping signals and thereby report the identities of the ping nodes (and gate nodes) to the server 63 via the routers 65 and coordinator 64.

According to some example embodiments, the network entity 62 comprises a server 63. The server 63, with reference to FIG. 4, may comprise a processor 20, a communication interface 22, a memory device 27, and a network manager 24.

In an example embodiment, the processor 20 may be configured (e.g., via execution of stored instructions or operation in accordance with programmed instructions) to control the operation of the server 63. The processor 20 may be embodied in a number of different ways. For example, the processor 20 may be embodied as a hardware device including one or more of various hardware processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 20 may be configured to execute instructions stored in a memory device (e.g., memory device 27 of FIG. 4) or otherwise accessible to the processor 20. The instructions may be permanent or non-volatile (e.g., firmware) or modifiable (e.g., software) instructions. Alternatively or additionally, the processor 20 may be hardware configured to execute functionality, for example when embodied as an ASIC. As such, whether configured by hardware or software methods, or by a combination thereof, the processor 20 may represent an entity and means (e.g., physically embodied in circuitry) capable of performing operations according to embodiments of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as a hardware executor of software or firmware instructions, the instructions may specifically configure the processor 20 to perform the algorithms and/or operations described herein when the instructions are executed. The processor 20 may include, among other things, a clock, an arithmetic logic unit (ALU) and logic gates configured to support operation of the processor 20.

The memory device 27 may include, for example, one or more volatile and/or non-volatile memories. In other words, for example, the memory device 27 may be a non-transitory electronic storage device (e.g., a computer-readable storage medium) comprising gates (e.g., logic gates) configured to store data (e.g., bits) that may be retrievable by a machine (e.g., a computing device including a processor such as processor 20). The memory device 27 may be configured to store information, data, applications, instructions or the like for enabling the server 63 to carry out various functions in accordance with example embodiments. For example, the memory device 27 may be configured to buffer input data for processing by the processor 20. Additionally or alternatively, the memory device 27 may be configured to store instructions for execution by the processor 20.

The communication interface 22 may be any means such as a hardware device or circuitry embodied in either hardware, or a combination of hardware and software that is configured to receive and/or transmit data from/to a network and/or any other device or module in communication with the server 63. In some example embodiments, the coordinator 64 may be considered an extension of the communication interface 22 to permit communication to various network entities. As such, the configuration and components of the communications interface 22 may be included in the server 63 and/or in the coordinator 64 to provide for network communications. The communication interface 22 may include, for example, an antenna (or multiple antennas) and supporting hardware and/or software for enabling communications with a communication network 30 or other devices (e.g., a monitoring device 108). In some environments, the communication interface 22 may alternatively or additionally support wired communication. As such, for example, the communication interface 22 may include a communication modem and/or other hardware/software for supporting communication via cable, digital subscriber line (DSL), universal serial bus (USB) or other mechanisms. In an exemplary embodiment, the communication interface 22 may support communication via one or more different communication protocols or methods. In some cases, IEEE 802.15.4 based communication techniques such as ZigBee or other low power, short range communication protocols, such as proprietary techniques based on IEEE 802.15.4 may be employed with or without radio frequency identification (RFID) or other short range communication techniques. In other embodiments, communication protocols based on IEEE 802.15.4a standards may also be established.

Some embodiments of the server 63 may include a user interface 21, such as an input/output device, for receiving instructions directly from a user. The user interface 21 may be in communication with the processor 20 to receive user input via the user interface 21 and/or to present output to a user as, for example, audible, visual, mechanical or other output indications. The user interface 21 may include, for example, a keyboard, a mouse, a joystick, a display (e.g., a touch screen display), a microphone, a speaker, or other input/output mechanisms. Further, the processor 20 may comprise, or be in communication with, user interface circuitry configured to control at least some functions of one or more elements of the user interface. The processor 20 and/or user interface circuitry may be configured to control one or more functions of one or more elements of the user interface through computer program instructions (e.g., software and/or firmware) stored on a memory device accessible to the processor 20 (e.g., volatile memory, non-volatile memory, and/or the like). In some example embodiments, the user interface circuitry is configured to facilitate user control of at least some functions of the server 63 through the use of a display configured to respond to user inputs. The processor 20 may also comprise, or be in communication with, display circuitry configured to display at least a portion of a user interface, the display and the display circuitry configured to facilitate user control of at least some functions of the server 63. According to various example embodiments, the user interface 21 may be local to the server 63 or remote from the server 63 and connected to the server 63 via the communications interface 22. In this regard, in some example embodiments, the user interface 21 may be the user interface of a computer that is connected to the server 63 via the Internet or another network to provide for remote interaction with the functionality of the network 30.

The network manager 24 may be configured to manage and direct the processor 20 to perform functions consistent with the various functionalities of the system and network 30. As indicated above, the processor 20 of an example embodiment may be embodied as, include or otherwise control, the network manager 24. The network manager 24 may be implemented by any means, such as a device or circuitry operating in accordance with firmware/software or otherwise embodied in hardware or a combination of hardware and firmware/software (e.g., processor 20 operating under software control, the processor 20 embodied as an ASIC or FPGA specifically configured to perform the operations described herein, or a combination thereof), thereby configuring the device or circuitry to perform the corresponding functions of the network manager 24, as described herein. Thus, in examples in which software is employed, a device or circuitry (e.g., the processor 20 in one example) executing the software forms a structure associated with such means.

According to some example embodiments, the network manager 24, with the communications interface, may support wireless bootloading. As such, for example, the network manager 24 may be configured to determine and/or control the configuration and thereby also the operation of the server 63 based on the current situation as determined by the server 63 or based on the instructions received by the network manager 24.

Further, the network manager 24 may be configured to cause the server 63 to perform the functionalities described with respect to the server 63 in FIGS. 1 and 2. In this regard, the network manager 63 may be configured to receive a status signal from a monitoring device 108, and in some example embodiments cause the server 63 to transmit an acknowledgement signal to the monitoring device. The network manager 24 may be configured to analyze the received status signal to determine whether the monitoring device 108 from which the status signal was received is located within a gate node field. If the monitoring device 108 is located within a gate node field, as indicated by the status signal, the network manager 24 may be configured to cause the server 63 to transmit a gate node alarm instruction signal, to thereby cause the gate node to tune the gate node's security resonator and trigger the alarm controlled by the gate device.

As mentioned above, and referring again to FIG. 3, the ping nodes 66 may be placed throughout a commercial environment and can be leveraged to determine a location of a monitoring device 108. According to some example embodiments, the hardware and configuration of a ping node may be included in a gate node, but the gate node may include additional hardware and functionalities as described herein. The ping nodes 66 may be configured to transmit ping signals, which may include ping node location data. The ping node location data may include a unique identifier of the ping node, such as a number or other unique indicator that corresponds to that specific ping node 66. In other embodiments, the ping node location data could include local coordinates or other similar data that may be used by the network to identify the location of a transmitting ping node. Ping nodes 66 may comprise antennas and radio transmitters for sending signals. In some embodiments, ping nodes 66 may have a tailored or specifically configured transmission signal strength so as to define the area which their ping signal can be received by the monitoring devices 108. Accordingly, the ping nodes 66 may be useful in locating monitoring devices 108 and other similar area-based features of the network 30.

Descriptions of example embodiments of ping nodes, and associated network systems, are provided in U.S. Provisional Patent Application No. 61/246,393, filed Sep. 28, 2009, entitled "Systems, Methods and Apparatuses for Managing Configurable Monitoring Devices;" U.S. Provisional Patent Application No. 61/248,196, filed Oct. 2, 2009, entitled "Systems, Methods and Apparatuses for Locating Configurable Monitoring Devices;" U.S. Non-Provisional patent application Ser. No. 12/636,564, filed Dec. 11, 2009, entitled "Systems, Methods, and Apparatuses for Managing Configurable Monitoring Devices;" and U.S. Non-Provisional patent application Ser. No. 12/887,228, filed Sep. 21, 2010, entitled "Retail Product Tracking System, Method, and Apparatus;" the contents of which are all hereby incorporated by reference in their entirety.

Ping nodes 66 may be involved in the frequent transmission of communications and therefore power utilization of a ping node 66 may be relatively high. While ping nodes 66 may be battery powered, in some example embodiments, ping nodes 66 may be powered through a building's wired power system. In this regard, routers 65 may also be configured to perform the function of a ping node 66. In some embodiments, ping nodes may utilize a battery.

Figure 5:
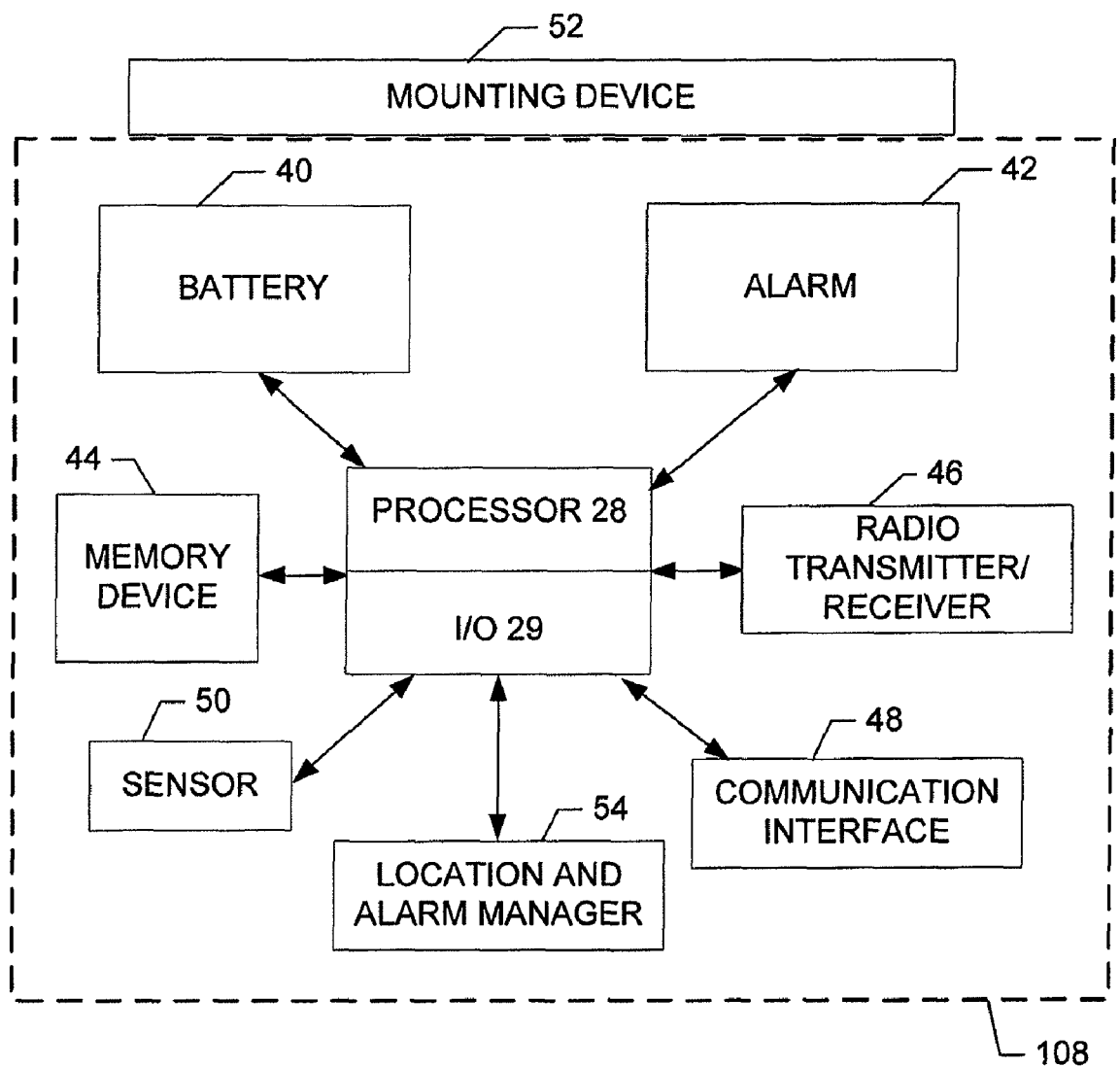
FIG. 5 illustrates an example monitoring device that is specifically configured for performing functionality according to an example embodiment.

FIG. 5 illustrates an example configuration of a monitoring device 108. A monitoring device 108 may be attached to, for example, retail articles and thus may travel throughout the retail environment as customers or service personnel carry articles throughout the retail environment. The monitoring device 108 may be configured to receive ping signals and a corresponding ping node or gate node identifier from a nearby ping node 66 or gate node 104, respectively. The monitoring device 108 may also be configured to transmit a status signal identifying the ping or gate node to, for example, the server 63. The server 63 may then take action with respect to the received status signal as described herein.

The monitoring device 108, which may also be referred to as a tag, may comprise a processor 28, a radio transmitter/receiver 46, an alarm 42, a battery 40 (e.g., to power the components of the monitoring device 108), a sensor 50, and an alarm manager 54. In some embodiments, the monitoring device 108 may include a memory device 44 and/or a input/output device 29. Further, in some embodiments, the monitoring device 108 may include a mounting device 52 for attaching the monitoring device 108 to an article, such as a retail product.

The processor 28 may act in accordance with a protocol and receive indications from components of the monitoring device 108. The processor 28 may be structurally the same or similar to the processor 20 as described with respect to the server 63 of FIG. 4, however configured differently based on, for example, the instructions provided by the memory device 44 or the processor 28 hardware configuration as, for example, and ASIC, to cause the monitoring device 108 to perform the respective functionality described herein. In some embodiments, the monitoring device 108 may comprise a battery 40, and, for example, a low power processor 28 may be more desirable to conserve battery life.

The processor 28 may also include an input/output (I/O) 29, which may include ports (or pins). According to some example embodiments, the I/O 29 may be configured to interface with any number of external devices such as, electronic security devices, tamper detection components, merchandising displays, equipment tags, employee identification cards, audio signal emitting devices (including alarms, speakers, piezo buzzers, etc,), microphones, lights (e.g., light emitting diodes (LEDs) including dual-color LEDs), buttons, keypads, monitors, displays that present human-readable information (e.g., for changeable pricing labels), sensors (e.g., accelerometers, movement sensors (e.g., jiggle switch), light sensors, temperature sensors), cameras, camera controls (e.g., configured to forward still pictures), security gates, store audio systems, customer counters, lighting switches, employee communicators (e.g., headsets, handheld radios), door strike mats, jewelry case mats, Lojack® devices, global positioning system (GPS) devices, barcode scanners, RFID readers, loyalty card scanners, communications hardware (e.g., USB hardware, Ethernet hardware, RS232 hardware), node devices, network entities (examples of which are discussed herein), and the like. As such, the I/O 29 may be configured to support various functionality that the monitoring device may be configured to perform. For example, an I/O pin or port that is configured to interface with a light sensor may be used to determine whether a protected article has been placed under a coat or otherwise concealed. As another example, an I\O pin or port may interface with an LED to cause the LED to flash at a regular interval to provide a visual indication of the status of the monitoring device and operate as a deterrent to would-be thieves. For yet another example, an I\O pin or port may be configured to interface with a piezo buzzer or other audio device to emit various audible tones by the processor 28. According to various example embodiments, actuation of the jiggle switch sensor and detection of the actuation by the I/O may be a trigger event, which may have a corresponding event indication signal, for the monitoring device to transition a commissioned monitoring device from a sleep state (e.g., which may be a low power mode) to an active awake state (e.g., to provide status signals).

The memory device 44 may include, for example, one or more volatile and/or non-volatile memories and may be structurally the same or similar to the memory device 27 of the server 63. In this regard, instructions stored on the memory device 44 may be specifically tailored to direct the operation of the monitoring device 108 via the processor 28. As indicated above with respect to the processor 28, the monitoring device 108 may be battery operated and thus a low power consuming memory device 44 may be more desirable. The memory device 44 may be an electronic storage device (e.g., a computer-readable storage medium) comprising gates configured to store data (e.g., bits) that may be retrievable by a machine (e.g., a computing device including a processor such as processor 28). The memory device 44 may be configured to store information, data, applications, instructions or the like, which can be organized in any manner (including as various types of functionality profiles), that enable the monitoring device 108 to carry out various functions in accordance with exemplary embodiments of the present invention. For example, the memory device 44 may be configured to buffer input data for processing by the processor 28. Additionally or alternatively, the memory device 44 may be configured to store instructions for execution by the processor 28.

The communications interface 48 may be any means such as a device or circuitry embodied in either hardware, or a combination of hardware and software that is configured to receive and/or transmit data from/to a network and/or any other device or module in wire or wireless communication with monitoring device 108. Communications interface 48 may include, for example, an antenna (or multiple antennas) and supporting hardware and/or software for enabling communications with network 30 or other devices. Additionally, to support network communications, the communications interface 48 may support the implementation of a system-wide synchronized clock. Synchronization of the clock may be maintained via a clock signal. Monitoring devices may include real time clock circuitry to support the synchronized clock and to regulate the use of precise communications windows. Additionally or alternatively, the communications interface 48 may include an unsynchronized clock.

In an example embodiment, the communications interface 48 may support communication via one or more different communication protocols or methods. In some embodiments, the communications interface 48 may be configured to support relatively low power, which may yield a relatively small communication proximity area. As such, for example, a low power and short range communication radio (e.g., radio transmitter/receiver 46) may be included in the communication interface 48. In some examples, the radio transmitter/receiver 46 may include a transmitter and corresponding receiver configured to support radio frequency (RF) communication in accordance with an IEEE (Institute of Electrical and Electronics Engineers) communication standards such as IEEE 802.15 or IEEE 802.15.4a, which may yield a relatively larger communication proximity area. For example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 or 4a based communication techniques, ZigBee, or other low power, short range communication protocols such as a proprietary technique based on IEEE 802.15.4 may be employed. According to some example embodiments, the communications interface 48 may be configured to support an Internet Protocol version 6 (IPV6) stack. The communications interface 48 may also support a Route Under MAC (Media Access Control) (RUM) protocol or a modified RUM protocol. Regardless of the protocol, the communications interface 48 may be configured to utilize a network identifier or network key, for example stored in the memory device 44, such as a personal area network (PAN) identifier. In some example embodiments, a monitoring device might not be permitted to communicate within the monitoring system without using a matching network identifier or key.

The sensor 50 may be any type of sensor, but in some example embodiments, the sensor is a jiggle switch configured to detect movement or handling (e.g., physical handling by a consumer or store employee, etc.) of the monitoring device 108 or an item affixed to monitoring device 108. In some example embodiments, an output of the sensor 50 may cause a monitoring device 108, that has been commissioned, to "wake-up" and enter an active state, for example, to detect ping signals and transmit a status signal.

The alarm 42 may be configured to produce an output, typically in the form of sound energy, although light, vibration or other outputs are also possible. As such, the alarm 42 may include an output device such as one or more of a speaker, vibration pack, light (e.g., a light emitting diode (LED)), or other device. The processor 28 may be configured to control operation of the alarm 42 based on, for example, instructions received from the server 63 or in response to defined indications from sensors, such as a tamper sensor. In this regard, based on the current configuration of the monitoring device 108, an alarm condition may be identified and signaled to the alarm 42. In some embodiments, the alarm condition may be associated with a predetermined alarm signal, which the processor 28 may be configured to provide to the alarm 42 to direct an output. The alarm 42 may be configured to provide any number of different outputs in response to various alarm signals including but not limited to a tone or series of tones, a ringing noise, a recorded or synthetic voice output, a solid or flashing light with any of various predetermined flash sequences, a vibration that is either continuous or pulsed with various different pulse sequences, or various other outputs or combinations of the above and/or other outputs.

As indicated above, one or more monitoring devices may be affixed to respective products or other articles (e.g., retail products) to facilitate monitoring of the article to which each monitoring device is affixed. In situations where the monitoring device 108 is affixed to a product or retail article, the mounting device 52 may take a form factor that is tailored for particular product packaging. As such, for example, in some situations, an adhesive, snap fastener, clip, clasp, tether, hook-and-loop fastener, magnetic fastener, pin connector, or other fastening device enabling direct connection of the monitoring device 108 to the corresponding article may be provided as the mounting device 52. One such mounting device may be configured to attach to the shaft of a golf club or similar article such as the device disclosed in U.S. Pat. No. 7,266,979 herein incorporated by reference in its entirety. Other such mounting devices may be configured to attach to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents is commonly owned by the assignee of the present application.

The location and alarm manager 54, which may be embodied in hardware (e.g., when the processor 28 is, for example, an ASIC) or software (e.g., when for example, the processor 28 executes instructions stored on memory device 44), and may be configured to manage and direct the processor 28 to perform functions consistent with the various functionalities of the monitoring device 108 described herein and, in particular, the functionality described with respect to FIGS. 1 and 2. The processor 28 of an example embodiment may be embodied as, include or otherwise control, the location and alarm manager 54. The location and alarm manager 54 may be implemented by any means, such as a device or circuitry operating in accordance with firmware/software or otherwise embodied in hardware or a combination of hardware and firmware/software (e.g., processor 28 operating under software control, the processor 28 embodied as an ASIC or FPGA specifically configured to perform the operations described herein, or a combination thereof), thereby configuring the device or circuitry to perform the corresponding functions of the location and alarm manager 54, as described herein. Thus, in examples in which software is employed, a device or circuitry (e.g., the processor 28 in one example) executing the software forms a structure associated with such means.

Further, the location and alarm manager 54 may be configured to cause the monitoring device 108 to perform the functionalities described with respect to the monitoring device 108 in FIGS. 1 and 2. In this regard, the location and alarm manager 54 may be configured to receive a ping signal, for example, from a gate node (e.g., gate node 104), and determine that the ping signal originated from the gate node. In this regard, a gate node may include a tunable security resonator and may be positioned within a field generated by a security gate device. The location and alarm manager 54 may also be configured to direct a transmitter (e.g., radio transmitter/receiver 46) to transmit a status signal to a network (e.g., network 30 and server 63) indicating that a monitoring device is within a field generated by the gate node.

In some example embodiments, the location and alarm manager 54 may be additionally configured to trigger an alarm on the monitoring device (e.g., alarm 42) in response to determining that the ping signal originated from the gate node prior to receiving any response from the network. Additionally or alternatively, the location and alarm manager 54 may be configured to direct the transmitter to transmit the status signal to the network to cause the network to issue an instruction to the gate node to alarm the security gate device by tuning a security resonator of the gate node. Further, according to some example embodiments, the location and alarm manager 54 may be alternatively or additionally configured to determine that a device type in the ping signal indicates that a device transmitting the ping signal is the gate node. Further, in some example embodiments, the monitoring device 108 does not include a security resonator such as an acousto-magnetic security device or a radio frequency security device.

Figure 6:
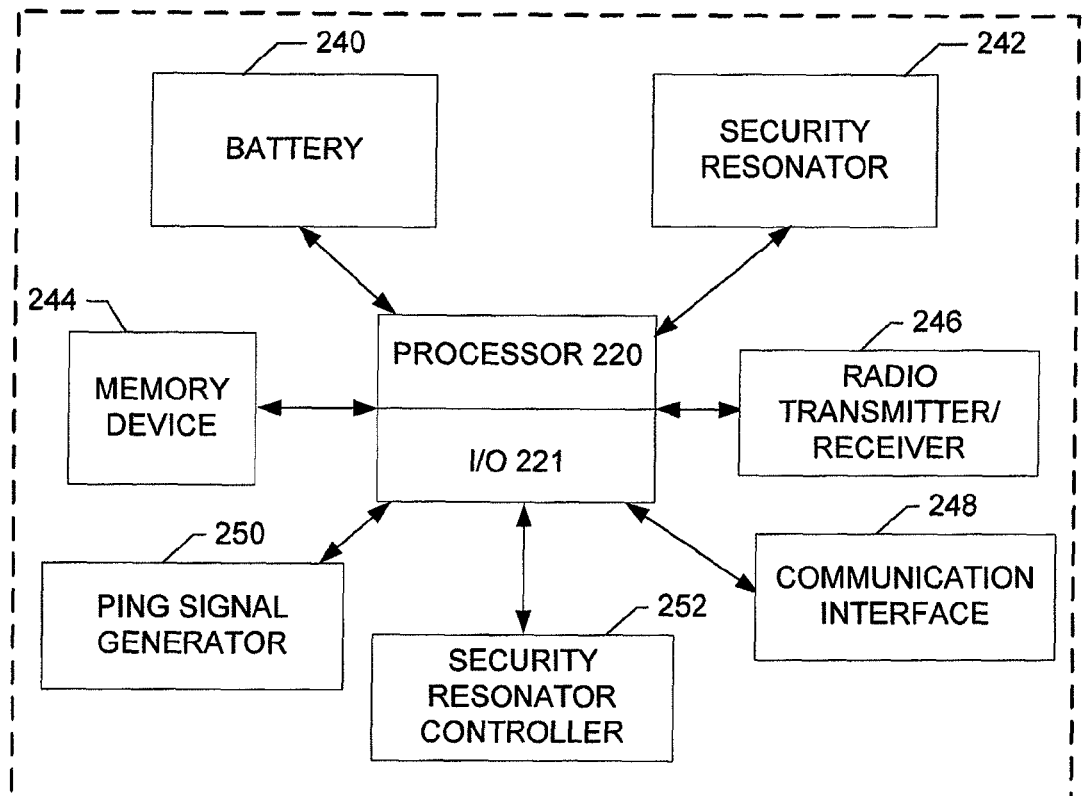
FIG. 6 illustrates an example gate node that is specifically configured for performing functionality according to an example embodiment.

FIG. 6 illustrates an example configuration of a gate node 104. A gate node 104 may be positioned at a fixed location that is within a field generated by a gate device as described above. The gate node 104, may comprise a processor 220, an input/output (I/O) 221, a memory device 244, a radio transmitter/receiver 246, a communication interface 248, a battery 240 (e.g., to power the components of the gate node 104), a security resonator 242, a ping signal generator 250, and a security resonator controller 252.

The processor 220 may act in accordance with a protocol and receive indications from components of the gate node 104. The processor 220 may be structurally the same or similar to the processor 20 as described with respect to the server 63 of FIG. 4, however configured differently based on, for example, the instructions provided by the memory device 244 or the processor 220 hardware configuration as, for example, and ASIC, to cause the gate node 104 to perform the respective functionality described herein. In some embodiments, the gate node 104 may comprise a battery 240, and, for example, a low power processor 220 may be more desirable to conserve battery life.

The processor 220 may also include an input/output (I/O) 221, which may include ports (or pins). According to some example embodiments, the I/O 221 may be configured to interface with any number of external devices such as, electronic security devices including the security resonator 242. The I/O 221 may also interface with tamper detection components, merchandising displays, equipment tags, employee identification cards, audio signal emitting devices (including alarms, speakers, piezo buzzers, etc,), microphones, lights (e.g., light emitting diodes (LEDs) including dual-color LEDs), buttons, keypads, monitors, displays that present human-readable information, sensors (e.g., accelerometers, movement sensors (e.g., jiggle switch, light sensors, temperature sensors, cameras, camera controls (e.g., configured to forward still pictures), security gate devices, store audio systems, customer counters, lighting switches, employee communicators (e.g., headsets, handheld radios), door strike mats, jewelry case mats, RFID readers, loyalty card scanners, communications hardware (e.g., USB hardware, Ethernet hardware, RS232 hardware), and the like. As such, the I/O 221 may be configured to support various functionalities that the gate node 104 may be configured to perform. As an example, an I\O pin or port may interface with an LED to cause the LED to flash at a regular interval to provide a visual indication of the status of the gate node 104.

The memory device 244 may include, for example, one or more volatile and/or non-volatile memories and may be structurally the same or similar to the memory device 27 of the server 63. In this regard, instructions stored on the memory device 244 may be specifically tailored to direct the operation of the gate node 104 via the processor 220. As indicated above with respect to the processor 220, the gate node 104 may be battery operated and thus a low power consuming memory device 244 may be more desirable. The memory device 244 may be an electronic storage device (e.g., a computer-readable storage medium) comprising gates configured to store data (e.g., bits) that may be retrievable by a machine (e.g., a computing device including a processor such as processor 220). The memory device 244 may be configured to store information, data, applications, instructions or the like, which can be organized in any manner (including as various types of functionality profiles), that enable the gate node 104 to carry out various functions in accordance with exemplary embodiments of the present invention. For example, the memory device 244 may be configured to buffer input data for processing by the processor 220. Additionally or alternatively, the memory device 244 may be configured to store instructions for execution by the processor 220.

The communications interface 248 may be any means such as a device or circuitry embodied in either hardware, or a combination of hardware and software that is configured to receive and/or transmit data from/to a network and/or any other device or module in wire or wireless communication with gate node 104. Communications interface 248 may include, for example, an antenna (or multiple antennas) and supporting hardware and/or software for enabling communications with network 30 or other devices via, for example, a ping signal.

In an example embodiment, the communications interface 248 may support communication via one or more different communication protocols or methods. In some embodiments, the communications interface 248 may be configured to support relatively low power, which may yield a relatively small communication proximity area. As such, for example, a low power and short range communication radio (e.g., radio transmitter/receiver 246) may be included in the communication interface 248. In some examples, the radio transmitter/receiver 246 may include a transmitter and corresponding receiver configured to support radio frequency (RF) communication in accordance with an IEEE (Institute of Electrical and Electronics Engineers) communication standards such as IEEE 802.15 or IEEE 802.15.4a, which may yield a relatively larger communication proximity area. For example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 or 4a based communication techniques, ZigBee, or other low power, short range communication protocols such as a proprietary technique based on IEEE 802.15.4 may be employed. According to some example embodiments, the communications interface 248 may be configured to support an Internet Protocol version 6 (IPV6) stack. The communications interface 248 may also support a Route Under MAC (Media Access Control) (RUM) protocol or a modified RUM protocol. Regardless of the protocol, the communications interface 248 may be configured to utilize a network identifier or network key, for example stored in the memory device 244, such as a personal area network (PAN) identifier. In some example embodiments, a monitoring device might not be permitted to communicate within the monitoring system without using a matching network identifier or key.

Figure 7:
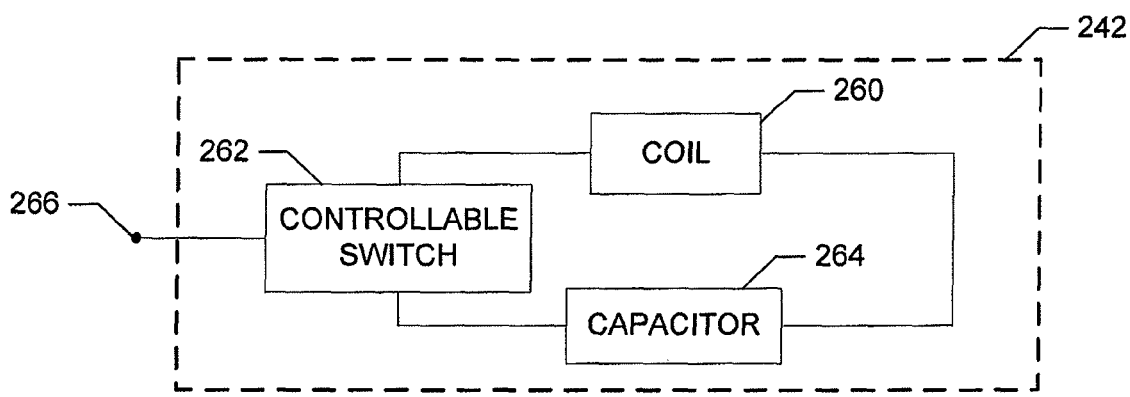
FIG. 7 illustrates an example security resonator according to various example embodiments.

The gate node 104 may also include a security resonator 242. The security resonator 242 may be a tunable device that allows the resonator to trigger an alarming function of a gate device (e.g., gate device 100) when tuned appropriately. FIG. 7 illustrates and example configuration of a security resonator 242. In this regard, the example security resonator 242 may include a coil 260, a capacitor 264, and a controllable switch 262. The coil 262 and the capacitor 264 may be selected to create an LC circuit (or RLC circuit with the inclusion of a selected resistor) that is configured to resonate at a frequency that will trigger a particular gate device when introduced to the field of the gate device. Through control of the controllable switch, via the lead 266 (possibly connected to the I/O 221), the security resonator 242 may be tuned or de-tuned to trigger or stop triggering, respectively, a gate device alarm. According to various example embodiments, the controllable switch may be a transistor, relay, or the like.

The gate node 104 may also include the ping signal generator 250 and the security resonator controller 252. The ping signal generator 250 and the security resonator controller 252, which may be embodied in hardware (e.g., when the processor 220 is, for example, an ASIC) or software (e.g., when for example, the processor 220 executes instructions stored on memory device 244), and may be configured to manage and direct the processor 220 to perform functions consistent with the various functionalities of the gate node 104 described herein and, in particular, the functionality described with respect to FIGS. 1 and 2. The processor 220 of an example embodiment may be embodied as, include or otherwise control, the ping signal generator 250 and the security resonator controller 252. The ping signal generator 250 and the security resonator controller 252 may be implemented by any means, such as a device or circuitry operating in accordance with firmware/software or otherwise embodied in hardware or a combination of hardware and firmware/software (e.g., processor 220 operating under software control, the processor 220 embodied as an ASIC or FPGA specifically configured to perform the operations described herein, or a combination thereof), thereby configuring the device or circuitry to perform the corresponding functions of the ping signal generator 250 and the security resonator controller 252, as described herein. Thus, in examples in which software is employed, a device or circuitry (e.g., the processor 220 in one example) executing the software forms a structure associated with such means.

The ping signal generator 250 may be configured to generate ping signals and a corresponding ping node or gate node identifier for inclusion in the ping signals. The ping signals may be received by monitoring devices 108 and the information in the ping signals may be leveraged to determine the location of the monitoring device 108. The ping signal generator 250 may be configured to provide ping signals at regular intervals.

Further, the security resonator controller 252 may be configured to cause the gate node 104 to perform the functionalities described with respect to the gate node 104 in FIGS. 1 and 2. In this regard, the security resonator controller 252 may be configured to receive an instruction to alarm a security gate device (e.g., gate device 100), for example, from a network (e.g., network 30) or possibly directly from a monitoring device, and in response to at least receiving the instruction to alarm the security gate device, tune a security resonator at a location such that a field generated by the security gate device interacts with the security resonator to cause the security gate device to trigger an alarm.

In some example embodiments, the security resonator controller 252 may be additionally or alternatively configured to direct a transmitter (e.g., radio transmitter/receiver 246) to transmit a ping signal for detection by a monitoring device (e.g., monitoring device 108) to permit the monitoring device to report detection of the ping signal and cause network transmission of the instruction to alarm the security gate device. Additionally or alternatively, according to some example embodiments, the security resonator controller 252 may be configured to direct the transmitter to transmit the ping signal where a portion of the ping signal indicates that the ping signal originated from a gate node. Further, according to some example embodiments, the security resonator controller 252 may be configured to tune the security resonator, where the security resonator is an acousto-magnetic security device, a radio frequency security device (e.g., an antenna), a magnetic security device, or a combination thereof. In some example embodiments, the security resonator may include more than one resonant device, such as, for example both a radio frequency security device and an acoustic-magnetic security device to broaden the compatibility of the of the gate node. In according to some example embodiments, the security resonator controller 252 may additionally or alternately be configured to tune the security resonator by closing a first switch to electrically connect an inductor with a capacitor. In according to some example embodiments, the security resonator controller 252 may additionally or alternately be configured to tune the security resonator to test or calibrate the field generated by the security gate device. Additionally, or alternately, according to some example embodiments, the security resonator controller 252 may be configured to receive the instruction to alarm the security gate device from the network, where the security gate device is not configured to communicate on the network.

In some example embodiments, the gate node 104 may be comprised of two separately operating devices. In this regard, a first device of the gate node 104 may be a ping node 66, as described above, with a unique identifier and/or device type associated with a gate node. The second device of the gate node may include a processor, memory, communications interface, the security resonator 242, and the security resonator controller 252. In this manner, the first gate node device may provide the ping signal, but the second gate node device may control the security resonator and be responsive to a gate node alarm instruction to tune the security resonator.

Embodiments of the present invention may be implemented by various means, such as hardware, firmware, processor, circuitry and/or other device associated with execution of software including one or more computer program instructions. For example, one or more of the procedures or activities described above may be embodied by computer program instructions. In this regard, the computer program instructions which embody the procedures or activities described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the corresponding procedure or activity. These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the corresponding procedure or activity. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the corresponding procedure or activity described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this disclosure. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

What is claimed is:

1. A method comprising:
    receiving a status signal indicating that a monitoring device is within a field generated by a gate node that is configured to control a tunable security resonator positioned within a field generated by a security gate device; and
    in response to receiving the status signal, directing a transmitter to transmit a gate node alarm instruction signal for receipt by the gate node to thereby instruct the gate node to tune the tunable security resonator and thereby trigger an alarm of the security gate device.

2. The method claim 1, wherein receiving the status signal includes receiving the status signal indicating that the monitoring device is within the field generated by the gate node, wherein the monitoring device is affixed to an article to be protected.

3. The method of claim 1 further comprising, in response to receiving the status signal:
    directing the transmitter to transmit a monitoring device status acknowledgement signal for receipt by the monitoring device, in response to receiving the status signal; and
    generating a log indicating receipt of the status signal.

4. The method of claim 1, wherein receiving the status signal includes receiving the status signal indicating that the monitoring device is within the field generated by the gate node, wherein the gate node is disposed in a fixed location and includes the tunable security resonator.

5. The method of claim 1, wherein receiving the status signal includes receiving the status signal indicating that the monitoring device is within the field generated by the gate node, wherein the monitoring device is a mobile device and the monitoring device does not include the tunable security resonator.

6. The method of claim 1, wherein receiving the status signal includes receiving the status signal, the status signal including information that identifies the gate node.

7. An apparatus comprising processing circuitry, the processing circuitry being configured to at least:
    receive a status signal indicating that a monitoring device is within a field generated by a gate node that is configured to control a tunable security resonator positioned within a field generated by a security gate device; and
    direct a transmitter to transmit a gate node alarm instruction signal for receipt by the gate node to thereby instruct the gate node to tune the tunable security resonator to trigger an alarm of the security gate device, in response to receiving the status signal.

8. The apparatus of claim 7, wherein the processing circuitry configured to receive the status signal includes being configured to receive the status signal indicating that the monitoring device is within the field generated by the gate node, wherein the monitoring device is affixed to an article to be protected.

9. The apparatus of claim 7, wherein the processing circuitry is further configured to:
 direct the transmitter to transmit a monitoring device status acknowledgement signal for receipt by the monitoring device, in response to receiving the status signal; and
 generate a log indicating receipt of the status signal.

10. The apparatus of claim 7, wherein the processing circuitry configured to receive the status signal includes being configured to receive the status signal indicating that the monitoring device is within the field generated by the gate node, wherein the gate node is configured to be disposed in a fixed location and include the tunable security resonator.

11. The apparatus of claim 7, wherein the processing circuitry configured to receive the status signal includes being configured to receive the status signal indicating that the monitoring device is within the field generated by the gate node, wherein the monitoring device is configured to be a mobile device and the monitoring device does not include the tunable security resonator.

12. The apparatus of claim 7, wherein the processing circuitry configured to receive the status signal includes being configured to receive the status signal, the status signal including information that identifies the gate node.

13. The apparatus of claim 7, wherein the processing circuitry includes a memory device having computer program instructions stored thereon, the computer program instructions, when executed, being configured to control operation of the apparatus.

14. A non-transitory computer readable medium having computer program instructions stored thereon, the computer program instructions being configured to, when executed by processing circuitry, cause an apparatus to at least:
 receive a status signal indicating that a monitoring device is within a field generated by a gate node that is configured to control a tunable security resonator positioned within a field generated by a security gate device; and
 direct a transmitter to transmit a gate node alarm instruction signal for receipt by the gate node to thereby instruct the gate node to tune the tunable security resonator to trigger an alarm of the security gate device, in response to receiving the status signal.

15. The medium of claim 14, wherein the computer program instructions configured to cause the apparatus to receive the status signal include being configured to cause the apparatus to receive the status signal indicating that the monitoring device is within the field generated by the gate node, wherein the monitoring device is configured to be affixed to an article to be protected.

16. The medium of claim 14, wherein the computer program instructions are further configured to cause the apparatus to:
 direct the transmitter to transmit a monitoring device status acknowledgement signal for receipt by the monitoring device, in response to receiving the status signal; and
 generate a log indicating receipt of the status signal.

17. The medium of claim 14, wherein the computer program instructions configured to cause the apparatus to receive the status signal include being configured to cause the apparatus to receive the status signal indicating that the monitoring device is within the field generated by the gate node, wherein the gate node is configured to be disposed in a fixed location and include the tunable security resonator.

18. The medium of claim 14, wherein the computer program instructions configured to cause the apparatus to receive the status signal include being configured to cause the apparatus to receive the status signal indicating that the monitoring device is within the field generated by the gate node, wherein the monitoring device is configured to be a mobile device and the monitoring device does not include the tunable security resonator.

19. The medium of claim 14, wherein the computer program instructions configured to cause the apparatus to receive the status signal include being configured to cause the apparatus to receive the status signal, the status signal including information that identifies the gate node.

* * * * *